United States Patent
Yeaglin

(10) Patent No.: US 9,168,898 B2
(45) Date of Patent: *Oct. 27, 2015

(54) MOVABLE VEHICLE ROOF SWEEPER

(71) Applicant: Quintin Machinery LLC, Lancaster, PA (US)

(72) Inventor: William E. Yeaglin, Mount Joy, PA (US)

(73) Assignee: Quintin Machinery LLC, Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/658,419

(22) Filed: Oct. 23, 2012

(65) Prior Publication Data

US 2013/0104322 A1     May 2, 2013

Related U.S. Application Data

(63) Continuation-in-part of application No. 12/807,048, filed on Aug. 26, 2010, now Pat. No. 8,584,295.

(51) Int. Cl.
    *B60S 3/04*             (2006.01)

(52) U.S. Cl.
    CPC .......................................... *B60S 3/04* (2013.01)

(58) Field of Classification Search
    CPC .......................................................... B60S 3/04
    USPC ......... 15/3, 53.1, 53.3, 97.1, DIG. 2; 134/123
    See application file for complete search history.

(56) References Cited

U.S. PATENT DOCUMENTS

| | | | | |
|---|---|---|---|---|
| 2,708,446 A * | 5/1955 | Phillips | ............................ | 134/93 |
| 3,072,131 A * | 1/1963 | Di Laurenzio | ................ | 134/123 |
| 3,459,203 A * | 8/1969 | Pritchard | ....................... | 134/123 |
| 5,076,304 A * | 12/1991 | Mathews | ..................... | 134/57 R |
| 5,160,430 A * | 11/1992 | Gasser et al. | ................. | 210/138 |
| 5,245,771 A * | 9/1993 | Walsh | .............................. | 37/269 |
| 5,337,437 A * | 8/1994 | Hingle | ........................ | 15/104.92 |
| 5,669,981 A * | 9/1997 | Stinnett et al. | .................... | 134/6 |
| 5,715,558 A * | 2/1998 | Johnson | ......................... | 15/53.3 |
| 5,802,654 A * | 9/1998 | Yeaglin | ......................... | 15/97.3 |
| 5,813,076 A * | 9/1998 | Belanger et al. | ............... | 15/97.3 |
| 5,989,356 A | 11/1999 | Candeletti | | |
| 6,453,500 B1 | 9/2002 | Schmitt | | |
| 6,654,978 B2 | 12/2003 | Bouchard | | |
| 7,617,561 B2 * | 11/2009 | Couture | ....................... | 15/306.1 |

(Continued)

OTHER PUBLICATIONS

Website—www.durasweeper.com.

(Continued)

*Primary Examiner* — Monica Carter
*Assistant Examiner* — Michael Jennings
(74) *Attorney, Agent, or Firm* — Barley Snyder

(57) ABSTRACT

The invention is a vehicle roof sweeper for the roofs of trucks and trailers that is rollable along the ground. The vehicle roof top sweeper that has retractable wheels and can be rolled using a pickup truck, car, tractor, forklift, or two or three people on foot. An embodiment of the invention is a vehicle roof sweeper having a pair of vertical supports, an upper crossbar connecting the pair of vertical supports, a plow assembly movable along the pair of vertical supports and positionable below the upper crossbar by a first lifting device, a base structure disposed on each of the pair of vertical supports, and retractable wheels positioned on opposite ends of the base structure.

16 Claims, 2 Drawing Sheets

(56) References Cited

U.S. PATENT DOCUMENTS

| | | |
|---|---|---|
| 8,333,845 B2 * | 12/2012 | Wentworth et al. ............ 134/32 |
| 2003/0051302 A1 * | 3/2003 | Fazio ............................. 15/53.2 |
| 2007/0174981 A1 * | 8/2007 | Smith et al. ................... 15/53.2 |
| 2009/0199880 A1 * | 8/2009 | Wentworth et al. ........... 134/123 |
| 2009/0217944 A1 * | 9/2009 | Munera et al. ................... 134/6 |
| 2009/0282630 A1 * | 11/2009 | Reed .............................. 15/97.3 |
| 2009/0282708 A1 | 11/2009 | Reed |
| 2010/0017979 A1 * | 1/2010 | Ennis ............................. 15/53.3 |

OTHER PUBLICATIONS

Website—http://www.trynexfactory.com/sweepex.htm.

* cited by examiner

MOVABLE VEHICLE ROOF SWEEPER

CROSS-REFERENCE TO RELATED APPLICATIONS

This application claims is a Continuation-in-Part (CIP) of U.S. patent application Ser. No. 12/807,048, filed Aug. 26, 2010.

FIELD OF THE INVENTION

The invention is related to brushing and cleaning and more specifically to cleaning snow and ice from the roofs of vehicles.

BACKGROUND

It is not an uncommon experience in localities which experience significant snowfall to see a slab of snow fly off the roof of a passenger car or van and strike a following vehicle. Regardless of the vehicle from which the snow is released, the experience is startling to the driver behind. However, if the snow or ice come loose from atop a truck, large semi-trailer, bus, van or other type of large vehicle, the event can be very dangerous.

This has always been a concern of the trucking industry. Therefore, trucking companies spend considerable money to clear snow and ice from the roofs of trailers after every major snow storm. This effort not only requires money but also takes significant time, so that the operation of the trucks of a large fleet can be delayed significantly after a snowstorm. Furthermore, since the snow and ice removal has generally been done manually by workers shoveling from atop the trailers, employers and insurance companies are very concerned about the danger of such workers slipping and falling from the typically 13 foot high trailer roofs. Furthermore, at least one state, New Jersey, requires that such roof snow and ice be cleared before a truck moves onto a public road, but even without such requirements, there is a significant increase in fuel consumption, and therefore an increase in the cost of operation, if snow or ice is not removed.

Several devices exist to attack this problem. U.S. Pat. No. 5,802,654, discloses an immovable bridge like structure supporting a vertically adjustable wedge shaped plow that vehicles can move under to have snow or ice removed. U.S. Pat. No. 5,989,356 uses a snow removal scraper supported on a pillar installed on cement footings.

Published Patent Application US2009/0282708 discloses a structure that is not imbedded in the ground, but instead is held down by four removable concrete blocks which rest on two base plates attached at the bottom of the vertical supports of the bridge like structure. The snow scraper structure can then be moved to a storage location when not in use. This is accomplished by using two forklifts vehicles with 5000 pound capacity. The forklifts first lift each of the 3 ton concrete blocks off the base plate. Then, by inserting their forks into pockets within the two base plates at the bottom of opposite sides of the bridge structure, the two forklifts work in tandem to move the structure. This is no easy task since the structure weights 8,800 pounds, is over 16 feet tall, and is approximately 17 feet wide.

While all of these solutions have been geared toward semi trailers in response to the needs of the trucking industry, there remains a need to efficiently remove snow and ice from the roof tops of other type of trucks, buses and other large vehicles.

A problem exists with these structures in that their plow designs are not always suitable for scraping snow from various types of vehicle roofs. For such plows, even where they include a protective strip along the edge which engages the vehicle roof top, damage to the vehicle roof may occur.

SUMMARY

The invention provides a tall vehicle roof top sweeper that has retractable wheels and can be rolled using a pickup truck, car, tractor or two or three people on foot. An embodiment of the invention is a vehicle roof sweeper having a pair of vertical supports, an upper crossbar connecting the pair of vertical supports, a plow assembly movable along the pair of vertical supports and positionable below the upper crossbar by a first lifting device, a base structure disposed on each of the pair of vertical supports, and a pair of retractable wheels positioned on opposite ends of the base structure.

BRIEF DESCRIPTION OF THE DRAWING

The invention will now be described by way of example with reference to the accompanying figures of which.

DETAILED DESCRIPTION OF THE EMBODIMENT

Figure 1:
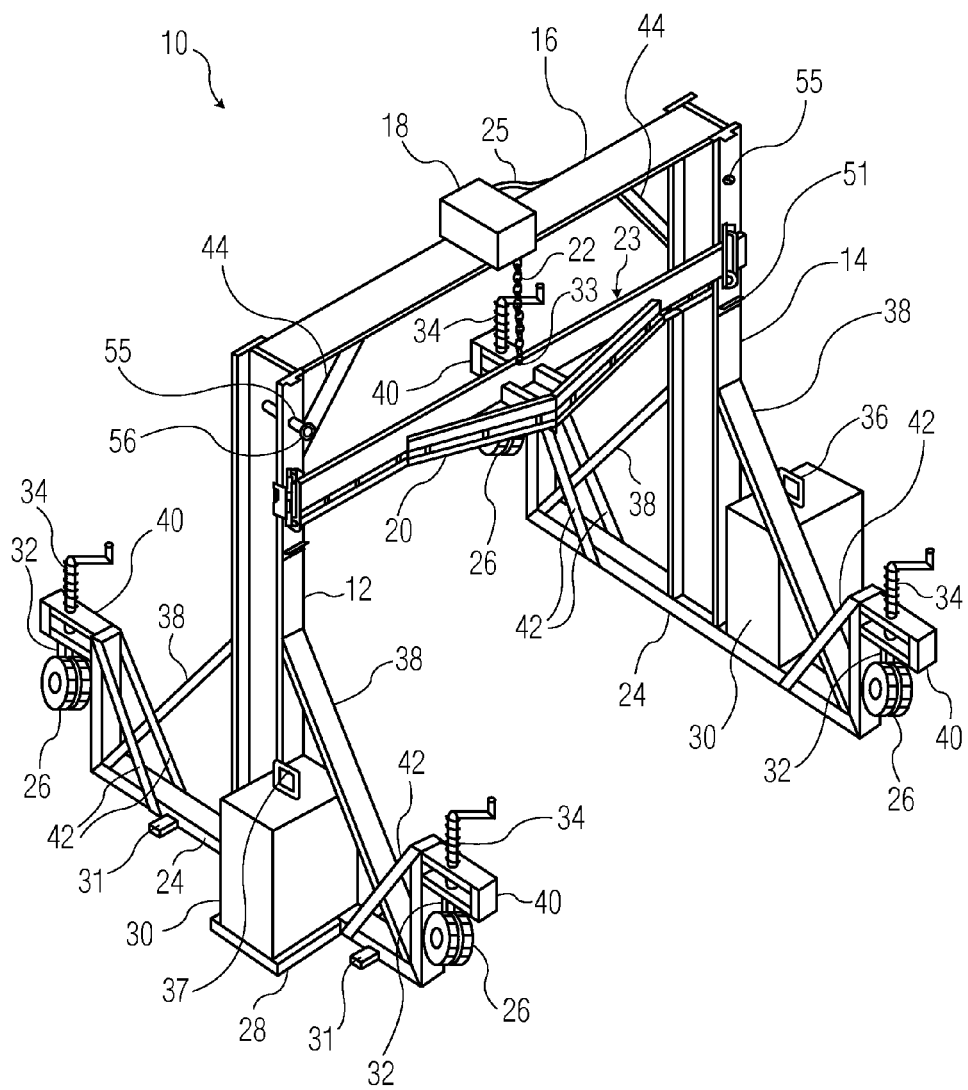
FIG. 1 is a perspective view of the an embodiment of the invention.

Referring first to FIG. 1 an embodiment of the invention is a vehicle roof sweeper 10 constructed with vertical support "I" beams 12 and 14 and an upper cross piece 16 forming an overhead bridge structure. In the embodiment, vertical support beams 12 and 14 extend approximately twenty feet above ground. They are also separated by a distance sufficient to easily move a typical semi-trailer or selected vehicle between them. It should be understood by those reasonable skilled in the art that the height and width may be adjusted to accommodate various size vehicles. The function of upper cross piece 16 is to support a winch 18, from which a plow assembly 23 is supported by a chain 22 connected to eyelet 33. An operator at ground level can operate winch 18 to raise or lower the plow assembly 23 to clear snow and ice from vehicles of different heights.

The winch 18 is a conventional electrically powered winch which is powered and controlled through cable 25. Cable 25 follows the structure of upper cross piece 16 and either beam 12 or 14 to a conventional control station (not shown) at ground level from which an operator can operate the winch 18 to raise or lower the plow assembly 23.

Figure 2:
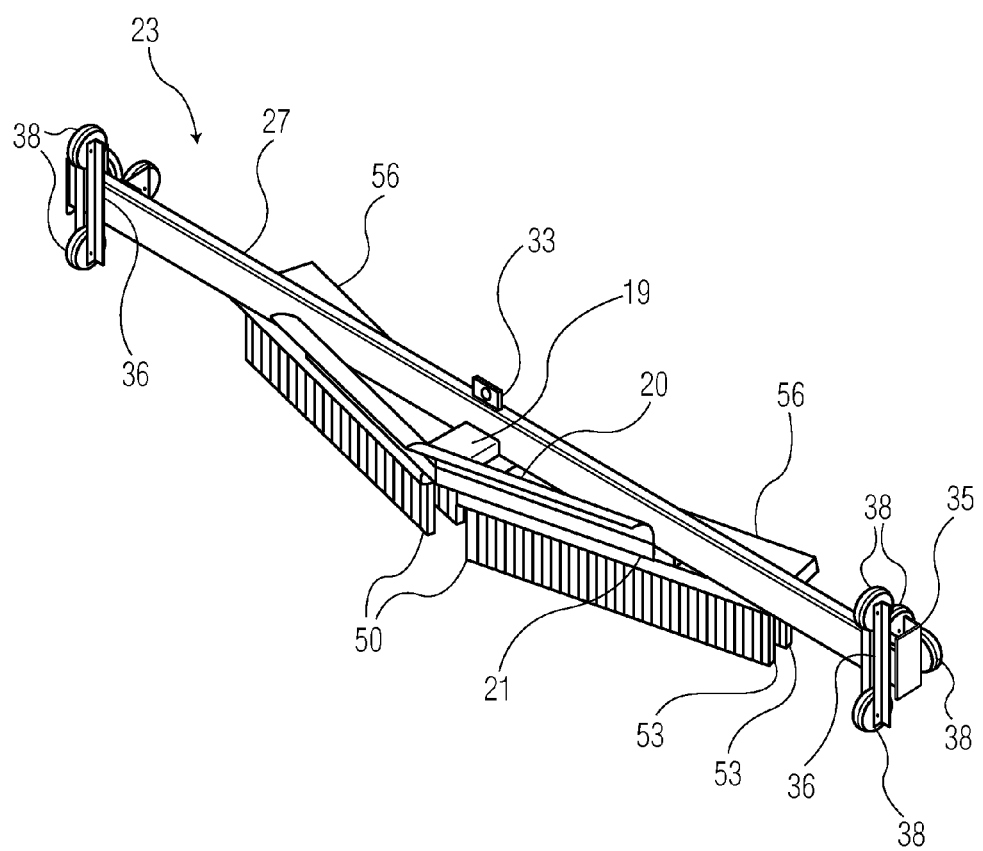
FIG. 2 is a detailed perspective view of a plow assembly used in the embodiment of FIG. 1.

Referring to FIG. 2, major components of the plow assembly 23 include a crossbar 27, fixtures 35, plow wheel assemblies 36, plow 20, and brush assemblies 50. Crossbar 27 is captured between beams 12 and 14 by fixtures 35 attached to the ends of crossbar 27 and wrapped around outer edges of flanges of "I" beams 12 and 14, respectively. Crossbar 27 is spaced from beam flanges by plow wheel assemblies 36. Each plow wheel assembly includes four wheels 38 located in line, spaced apart, and located at opposite edges of crossbar 27, so that crossbar 27 can roll along the I beam flanges and maintain its original spacing from the flanges as it is raised and lowered by winch 18. The plow 20 is attached to the cross bar 27 at its ends and is also attached to the crossbar 27 though a support member 19 near its center. Brush assemblies 50 are attached to an edge 21 of the plow 20. Such attachment may be by welding, through the use of suitable fasteners or other suitable attachment means. It should also be understood that the plow 20 and brush assemblies 50 may be formed as an integral sub assembly. The plow 20 and brush assembly 50 are arranged in a v-shape to push snow to the sides of the vehicle roof as it passes under the vehicle roof sweeper 10. It should be understood that alternate shapes for the plow assembly are possible. It may be linear, angled to one side, arcuate or other suitable shapes depending upon the desired removal path for snow from the vehicle top.

Brush assemblies 50 will now be described in greater detail. Each brush assembly has a base plate 56 from which one or more rows of brushes 53 extend. Although two rows are shown in the embodiment, one row, three rows or more may be chosen according to design preferences. Each brush 53 may be formed of a material selected to have sufficient stiffness to push snow or ice while having sufficient flexibility to prevent scraping or other damage to the top surface of the vehicle passing through the vehicle roof sweeper 10. For example, the brushes may be formed of polypropylene, polyetelyne, or other suitable brush materials and may be sized accordingly by a modular arrangement. Base plates 56 may be formed of metal and serve to both hold the brushes 53 and secure them to the plow 20 by welding, through the use of suitable fasteners or other suitable attachment means. The base plates may alternatively be formed of suitable composite or other materials.

Another feature used to protect the vehicle being cleared of snow or ice is the use of lower stops 51. Lower stops 51 are attached to beams 12 and 14 at a height appropriate for the vehicles being cleared by a particular vehicle roof sweeper 10, so that the selected vehicle being driven under vehicle roof sweeper 10 is not damaged by plow assembly 23. Stops 51 are typically installed 13 feet above the ground but clearly could be installed at different heights, and could also be attached by welding, or adjustably by bolts or other fasteners, so that their heights could occasionally be changed.

Upper stop holes 55 are located on the beams 12 and 14 just below the cross piece 16 and are also used for safety purposes. When the vehicle roof sweeper 10 is taken out of service for long periods of time, for instance during summer, the plow assembly 23 can be raised to its maximum height and support pins 56 (only one shown) inserted through upper stop holes 55. This arrangement supports the plow assembly 23 and takes the weight off of chain 22 while the plow assembly 23 is high above any truck or trailer roofs.

Operation of the vehicle roof sweeper 10 is quite straightforward. Once the working height of plow 20 is set by the use of the winch 18, all that is required is that a vehicle be slowly driven under vehicle roof sweeper 10 in the direction indicated by arrow A. Since all that is needed is relative motion between plow 20 and the roof of the vehicle, it is immaterial that the vehicle is in motion rather than the plow, so snow and ice will be pushed off the roof and over the sides and rear of the vehicle. It should be appreciated that even with a trailer moving at only one mile per hour, it will take less than a minute to clear the roof of a typical trailer.

The present invention therefore provides an inexpensive, rapid, and safe way to clear snow and ice from truck and trailer roofs.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, plow 20 can be constructed with various heights to accommodate the weather of different regions, it could be constructed with a single angled blade so that snow and ice are pushed off only one side of the vehicle, or it can be constructed with a curved surface at the upper edge to deflect snow and ice downward to assure they do not go over the top of the plow.

Stably supporting the vehicle roof sweeper 10 are base structures 24 which include retractable wheels 26. The base structures 24 also each include a platform 28 so that when the wheels 26 are refracted, as shown in FIG. 1, the base structures 24 sit on the support surface. When the vehicle roof sweeper 10 is in use clearing snow, ballasts 30, typically made of concrete, are placed on platforms 28 to prevent movement of vehicle roof sweeper 10 as a vehicle moves through it for snow and ice clearing. Additional means to prevent such movement of the structure are plates 31 which are attached to base structures 24 and include holes through which locking devices such as stakes or other devices can be inserted into the support surface.

The four sets of dual wheels 26 are mounted on swivel casters 32 that are held at the ends of base structures 24 by jack supports 40. Therefore, once the wheels are lowered and lift the structure, the vehicle roof sweeper 10 can be moved in any direction. Wheels 26 and casters 32 are mounted on trailer type wheel jacks 34, and each jack 34 is rated for 5,000 pound lifting capacity.

When the vehicle roof sweeper 10 is to be moved, ballasts 30 are removed from platforms 28 using lifting hooks 37 or some other lifting structure. The removal of the ballasts can easily be accomplished by a small fork lift. Then wheels 26 are lowered using wheel jacks 34, thereby raising the vehicle roof sweeper 10 so that base structures 24 are typically about 2 inches off the ground. In the embodiment, the ballasts 30 each weigh about 2,000 pounds, and when the ballasts are removed, the vehicle roof sweeper 10 weighs about 4,300 pounds.

The vertical support beams 12 and 14 are attached to the base structures 24, and stabilizing supports 38 prevent motion between them. The stabilizers 44 are also attached between the upper cross piece 16 and the vertical support beams 12 and 14 to prevent distortion of the structure. Similarly, jack stabilizers 42, which are attached between jack supports 40 and the base structures 24, stabilize the jacks 34, casters 32, and wheels 26. Therefore, the vehicle roof sweeper 10 will not distort or tip either when it is functioning to remove snow and ice or when it is being moved. This stability holds even when the unit is in service upon or being moved on a rough stone surface.

The present invention thereby is advantageously easily and safely moveable to permit storage when it is not in use and it also advantageously provides snow/ice removal with reduced likelihood of damage to the upper surface of the vehicle being cleared.

It is to be understood that the form of this invention as shown is merely an embodiment. Various changes may be made in the function and arrangement of parts; equivalent means may be substituted for those illustrated and described; and certain features may be used independently from others without departing from the spirit and scope of the invention as defined in the following claims.

What is claimed:

1. A vehicle roof sweeper comprising:
a pair of vertical supports;
an upper crossbar connecting the pair of vertical supports;

a plow assembly movable along the pair of vertical supports and positioned below the upper crossbar by a first lifting device;

a base structure disposed on each of the pair of vertical supports; and a brush assembly having
- a base plate rigidly fixed to the plow assembly, and
- at least one row of brushes fixed to the base plate.

2. The vehicle roof sweeper of claim 1, wherein the brush assembly is V-shaped, angled towards one side, or arcuate.

3. The vehicle roof sweeper of claim 1, wherein the row of brushes have a modular arrangement.

4. The vehicle roof sweeper of claim 1, wherein the brush assembly includes at least two rows of brushes having a modular arrangement.

5. The vehicle roof sweeper of claim 1, wherein the brush assembly includes at least three rows of brushes having a modular arrangement.

6. The vehicle roof sweeper of claim 1, further comprising retractable wheels positioned on opposite ends of the base structure.

7. The vehicle roof sweeper of claim 6, wherein the retractable wheels are connected to the base structure through support jacks.

8. The vehicle roof sweeper of claim 6, wherein the retractable wheels are mounted on swivel casters connected to an end of the support jacks.

9. The vehicle roof sweeper of claim 1, wherein the plow assembly and brush assembly each have a complimentary v-shape.

10. The vehicle roof sweeper of claim 1, further comprising a ballast positioned on the base structure.

11. The vehicle roof sweeper of claim 1, wherein the brush assembly is fixed to an edge of the plow.

12. The vehicle roof sweeper of claim 1, wherein the first lifting device is an electric winch.

13. The vehicle roof sweeper of claim 1, wherein the base structures further comprise fastener receiving plates.

14. The vehicle roof sweeper of claim 1, wherein the fastener receiving plates have fastener receiving holes.

15. The vehicle roof sweeper of claim 1, wherein the vertical supports each have complimentary upper stop holes positioned below the upper crossbar.

16. The vehicle roof sweeper of claim 15, wherein the upper stop holes are complimentary in shape to plow assembly support pins.

* * * * *